(12) United States Patent
Malnou

(10) Patent No.: US 9,140,410 B2
(45) Date of Patent: Sep. 22, 2015

(54) ISOLATING VALVE

(71) Applicant: TOTAL S.A., Courbevoie (FR)

(72) Inventor: Dominique Malnou, Poey de Lescar (FR)

(73) Assignee: TOTAL S.A., Courbevoie (FR)

( * ) Notice: Subject to any disclaimer, the term of this patent is extended or adjusted under 35 U.S.C. 154(b) by 0 days.

(21) Appl. No.: 14/353,982

(22) PCT Filed: Oct. 23, 2012

(86) PCT No.: PCT/FR2012/052425
§ 371 (c)(1),
(2) Date: Apr. 24, 2014

(87) PCT Pub. No.: WO2013/060979
PCT Pub. Date: May 2, 2013

(65) Prior Publication Data
US 2014/0263360 A1    Sep. 18, 2014

(30) Foreign Application Priority Data
Oct. 25, 2011 (FR) ..................... 11 59649

(51) Int. Cl.
*F17C 13/12*   (2006.01)
*F16K 5/06*   (2006.01)
(Continued)

(52) U.S. Cl.
CPC ............. *F17C 13/126* (2013.01); *F16K 5/0631* (2013.01); *F16K 5/0673* (2013.01); *F16K 5/20* (2013.01); *F16K 5/205* (2013.01); *F16K 27/067* (2013.01); *F17C 13/04* (2013.01)

(58) Field of Classification Search
CPC ... F16K 15/042; F16K 15/044; F16K 15/048; F16K 15/046; F16K 3/16; F16K 27/00; F16K 27/067; F16K 1/443; F16K 1/446; F16K 1/305; F16K 1/307; F16K 5/0668; F16K 24/02; F16K 5/0673; F16K 5/0631; F16K 5/205; F16L 37/373; F17C 13/04; F17C 13/126; Y10T 137/87917; Y10T 137/7036
USPC ............ 137/613, 375; 251/1.1, 174, 360, 316
See application file for complete search history.

(56) References Cited

U.S. PATENT DOCUMENTS 2,665,879 A * 1/1954 Housekeeper et al. .. 251/315.01
2,948,553 A    8/1960 Gill et al.
(Continued)

FOREIGN PATENT DOCUMENTS

WO   WO-2004/083693 A1   9/2004
WO   WO-2006/024860 A1   3/2006
WO   WO-2010/131039 A1   11/2010

*Primary Examiner* — Craig Schneider
*Assistant Examiner* — Craig J Price
(74) *Attorney, Agent, or Firm* — Harness, Dickey & Pierce, P.L.C.

(57) ABSTRACT

An isolating valve includes a body having a canal for the passage of fluid, which is intended to be shut off by upstream and downstream spherical plugs, that can be actuated independently of one another between positions allowing the passage of fluid through the canal and positions of shutting off the canal, and a sealing checker, opening into the canal and between the two spherical plugs. The upstream plug is equipped with an upstream seat of the "simple piston effect" type and has no downstream seat. The downstream plug is equipped with an upstream seat of the "simple piston effect" type and with a downstream seat of the "double piston effect" type.

10 Claims, 8 Drawing Sheets

(51) Int. Cl.
  *F16K 5/20* (2006.01)
  *F16K 27/06* (2006.01)
  *F17C 13/04* (2006.01)

(56) References Cited

U.S. PATENT DOCUMENTS

| | | | | |
|---|---|---|---|---|
| 3,109,623 | A | * | 11/1963 | Bryant .................. 251/315.05 |
| 3,114,386 | A | * | 12/1963 | Dumm .................. 251/315.08 |
| 3,173,647 | A | * | 3/1965 | Bryant .................. 251/315.08 |
| 3,379,410 | A | * | 4/1968 | Stewart, Jr. .................. 251/174 |
| 3,830,465 | A | * | 8/1974 | Allen .................. 251/360 |
| 3,960,363 | A | * | 6/1976 | Domyan .................. 251/174 |
| 4,276,905 | A | * | 7/1981 | Lourdeaux .................. 137/613 |
| 4,345,738 | A | * | 8/1982 | Ripert .................. 251/315.01 |
| 4,519,412 | A | * | 5/1985 | Grazioli .................. 251/315.08 |
| 4,557,286 | A | * | 12/1985 | Nagano .................. 251/317 |
| 4,673,164 | A | * | 6/1987 | Nakanishi et al. .................. 251/174 |
| 4,890,643 | A | * | 1/1990 | Oliver .................. 137/614.11 |
| 5,271,427 | A | * | 12/1993 | Berchem .................. 137/375 |
| 5,533,738 | A | * | 7/1996 | Hoffmann .................. 251/172 |
| 5,642,754 | A | * | 7/1997 | Rabby .................. 137/613 |
| 6,073,648 | A | * | 6/2000 | Watson et al. .................. 137/375 |
| 6,220,290 | B1 | * | 4/2001 | Lomax .................. 137/613 |
| 6,675,832 | B1 | * | 1/2004 | Tran et al. .................. 137/613 |
| 6,830,069 | B2 | * | 12/2004 | Shillito et al. .................. 137/613 |
| 7,275,564 | B2 | * | 10/2007 | Bazin et al. .................. 137/625.47 |
| 7,287,544 | B2 | * | 10/2007 | Seneviratne et al. .................. 137/375 |
| 7,699,074 | B2 | | 4/2010 | Lomax |
| 8,733,733 | B2 | * | 5/2014 | Collison et al. .................. 251/174 |
| 8,752,653 | B2 | * | 6/2014 | Seneviratne et al. .................. 137/613 |
| 2010/0090146 | A1 | * | 4/2010 | Keeper et al. .................. 251/172 |

* cited by examiner

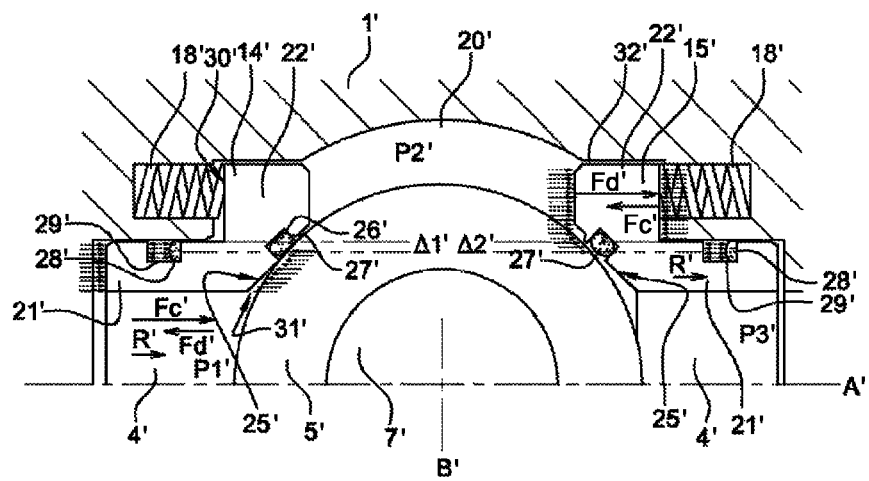
PRIOR ART Fig. 2
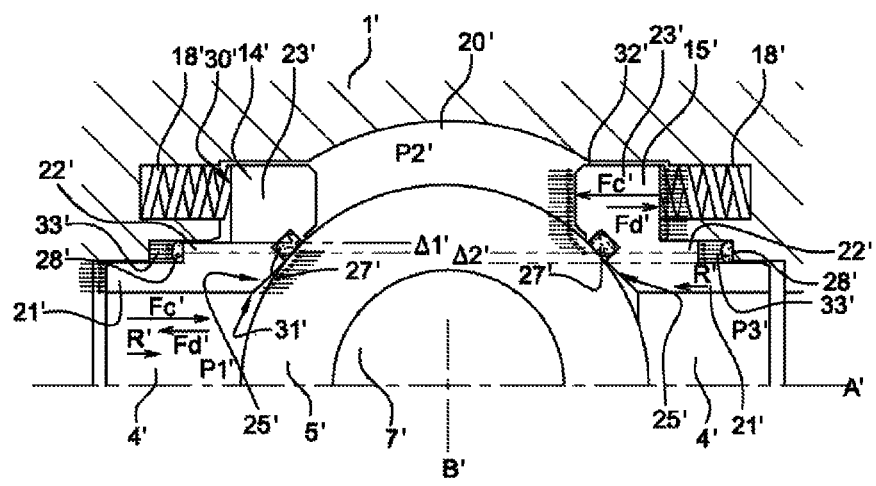
PRIOR ART Fig. 3

ISOLATING VALVE

CROSS-REFERENCE TO RELATED APPLICATIONS

This application is a National Phase Entry of International Application No. PCT/FR2012/052425, filed on Oct. 23, 2012, which claims priority to French Patent Application Serial No. 1159649, filed on Oct. 25, 2011, both of which are incorporated by reference herein.

BACKGROUND

The present invention relates to an isolation valve, designed in particular for equipping a liquefied gas storage tank.

Conventionally, a gas storage tank comprises isolation means allowing any flow of gas out of the tank to be prevented. To this end, it is known to equip the tank with a movable safety valve mounted in a gas extraction pipe and blocked by a fusible pin. In normal operation, the safety valve is held by the pin in a position wherein it does not impede the flow of the liquefied gas. In the event of fire, the pin yields and frees the safety valve, which blocks the flow of gas. In practice, such a safety valve only makes it possible to limit the flow of gas, but does not afford a total seal. A valve is therefore added downstream of the safety valve, said valve providing the sealing function even if it is subjected to high temperatures in the event of a fire. This valve has the following disadvantages.

First of all, a valve is designed to control the flow of fluid through a duct and not to provide an isolation function. Consequently, such a valve is generally not perfectly sealed. Moreover, actuation of such a valve, even if it is motorized, is relatively slow. Indeed, the valve is actuated by rotation of a shaft, and transition from the fully open position to the fully closed position requires several turns.

It is known, moreover, to use for different applications, valves offering a good seal, such as in particular valves of the "double block and bleed" or DBB type, described in particular in documents EP 1 618 325 and WO 2010/131039. A valve of this type conventionally comprises a body including a fluid flow channel, designed to be plugged by upstream and downstream spherical plugs, operable independently of one another between positions for fluid flow through said channel and positions plugging the channel. The body is also equipped with bleeding means leading into the aforementioned channel, between the upstream and downstream plugs.

The use of two means of isolation in series, consisting of the upstream and downstream plugs, makes it possible to guarantee that no fluid escapes, even in the event of failure of one of the isolation means. The bleeding means make it possible to check the proper sealing of the plugs. To this end, it is sufficient to close the plugs, to bleed the part of the channel located between the two plugs a first time, then checking with a second bleed that at the end of a predetermined period no fluid has escaped downstream of the upstream plug.

The "double block and bleed" type valve also comprises, for each upstream and downstream plug, an upstream seat and a downstream seat, associated with elastic return means so as to come to bear sealingly against the spherical plugs around the fluid flow channel. Such a valve comprises several dead volumes, that is to say confined volumes capable of capturing fluid.

In the case where both plugs are in the plugging position, a first dead volume is formed in the fluid flow channel, between the upstream and downstream plugs. A second dead volume is formed by a volume external to the aforementioned channel, located between the outer wall of the upstream plug and the body. The second dead volume also comprises the internal volume of the upstream plug which, in the plugging position of the upstream plug, communicates with the aforementioned external volume.

Finally, a third dead volume is formed by a volume external to the aforementioned channel, located between the outer wall of the downstream plug and the body. The third dead volume also comprises the internal volume of the downstream plug which, in the plugging position of the downstream plug, communicates with the aforementioned external volume.

In the event of fire, the gas caught inside these dead spaces expands and can cause the cracking, even the explosion of the valve body, causing the complete destruction of the valve. The gas can then escape through the cracks that are formed, thus supplying fuel to the fire. In order to allow the escape of the gas contained in the second and third dead volumes, the seats of the upstream and downstream plugs can be of the "simple piston effect" or SPE type. In this case, the seats are designed to detach from the corresponding plugs in the event of overpressure in the dead volumes.

Such a design has the following disadvantages. First of all, gas can escape to the outside, downstream, due to detachment of the downstream seat from the downstream plug. Even if only a limited volume of gas is involved (corresponding to the third dead volume), this gas nevertheless supplies fuel to the fire. Furthermore, the seats do not allow to evacuate the gas contained in the first dead volume, between the upstream and downstream plugs, the expansion of this gas which may cause, as indicated above, cracking or explosion of the valve body.

The invention has in particular the aim of providing a simple, effective and economical solution to this problem.

SUMMARY

To this end, it proposes an isolation valve comprising a body including a fluid flow channel, designed to be closed by upstream and downstream spherical plugs, capable of being actuated independently of one another between positions allowing fluid flow through said channel and positions plugging the channel, and sealing checking means leading into said channel between the two spherical plugs, the spherical plugs being equipped with seats associated with elastic return means so as to come to bear sealingly against the spherical plugs around said channel, a dead volume being defined between the outside wall of each spherical plug and the body, outside the fluid flow channel, each seat being designed to be subjected, on the one hand, to the pressure of the fluid situated in said channel and, on the other hand, to the pressure of the fluid contained in the dead space, characterized in that the upstream spherical plug is equipped with an upstream seat and has no downstream seat, the downstream spherical plug being equipped with an upstream seat and a downstream seat, the upstream seats being capable of separating from the spherical plugs in the event of an overpressure inside the corresponding dead volumes, the downstream seat being designed to remain in sealing abutment on the downstream spherical plug in the event of overpressure inside the corresponding dead volume.

In this manner, in the event of overpressure inside the dead volumes, for example if the valve is subjected to a fire, the gas contained in each of the dead volumes can escape upstream without risking cracking of the body. Moreover, the gas can normally not escape downstream, so that it cannot fuel the fire. Advantageously, the upstream seat of the upstream plug comprises an annular spherical segment or frusto-conical surface, designed to come into sealing contact with an upstream plug and covered, at least in part, with a layer of tungsten carbide.

The fluid intended to pass through the valve can have contaminants or abrasive particles which threaten to damage the seat and affect the sealing between the seat and the spherical plug, in particular when the plug is actuated. The tungsten carbide layer exhibits high hardness, which protects the upstream seat. The tungsten carbide deposit, however, has a high cost. It is therefore reserved by preference for the seat that is most subject to this type of damage, that is to say the upstream seat of the upstream plug.

According to one feature of the invention, the upstream seat and/or the downstream seat of the downstream plug comprise annular inserts design to come to bear sealingly against the upstream plug. Such inserts are less resistant to contaminants and to abrasive particles but they provide the sealing function at a lower cost. These inserts can be made of polymer.

Preferably, the upstream seat and/or the downstream seat of the downstream plug also comprise an annular spherical segment or frusto-conical surface, capable of coming into sealing contact against the downstream plug in the event of deterioration of the inserts. In this manner, even in the event of deterioration of the inserts, sealingly is provided between the corresponding seats and the downstream plug. Such a deterioration can arise either from wear, or from a temperature rise due to a fire.

According to another feature of the invention, the upstream seats of the upstream and downstream plugs are movable in rotation relative to the body, along a longitudinal axis, each upstream seat comprising a first and a second surfaces, oriented respectively in the direction opposite the plug and in the direction facing the plug, designed to be subjected to the pressure of the fluid in the dead volume so that this pressure being applied to the first surface tends to apply the seat onto the plug this pressure being applied to the second surface tends to detach the seat from the plug, the projection of the second surface onto a plane perpendicular to the longitudinal axis being greater than the projection of the first surface onto said perpendicular plane, so that the resulting force applied by the pressure of the fluid in the dead volume to the seat tends to detach it from the corresponding plug. Both upstream seats are therefore of the "simple piston effect" or SPE type, and allow the gas contained in the dead volumes and subjected to an overpressure to escape upstream.

Advantageously, the downstream seat of the downstream plug is movable in translation, relative to the body, along a longitudinal axis, and comprises a first and a second surfaces, oriented respectively in the direction opposite the downstream plug and in the direction facing the downstream plug, designed to be subjected to the pressure of the fluid in the dead volume so that that pressure, applied to the first surface, tends to apply the seat onto the downstream plug and that pressure, applied to the second surface, tends to detach the seat from the downstream plug, the projection of the first surface onto a plane perpendicular to the longitudinal axis being greater than that of the second surface so that the resulting force applied by the pressure of the fluid in the dead volume onto the downstream seat tends to press it against the downstream plug.

The downstream seat equipping the downstream plug is of the "double piston effect" or DPE type, and normally prevents gas from escaping downstream. The valve can comprise at least one annular seal providing the sealing between each upstream seat and the body, the seal being accommodated in an annular groove of the body or of the upstream seat.

In this manner, the pressure of the fluid contained in the corresponding dead volume and which enters into the groove, is applied on the one hand to the surface of the seal and, on the other hand, on the surface of the groove opposite the seal. The projections of these surfaces being identical, the resulting forces cancel. In other words, such a structure makes it possible to reduce the active portion of the first surface of the upstream seat so as to reduce the force tending to press the seat against the corresponding plug. Thus, ultimately, the force resulting from the pressure of the fluid on the first and second surfaces tends to separate the upstream seat from the corresponding plug.

Moreover, the valve can comprise at least one annular seal providing the sealing between the downstream seat of the downstream plug and the body, the seal being mounted in an annular space defined between an outer cylindrical wall of the seat and an inner cylindrical wall of the body, having a greater diameter than the outer wall of the seat. Such a structure has the effect of increasing the second surface of the downstream seat compared with the first surface, so that the resulting force tends to press the downstream seat against the downstream plug in the event of overpressure inside the corresponding dead volume. Preferably, the sealing checking means comprise bleeding means leading into the section of the fluid flow channel located between the upstream and downstream spherical plugs.

The invention also relates to a storage tank for gas, particularly liquefied gas, comprising a pipe for extracting the gas contained in the tank, characterized in that the extraction pipe comprises a valve of the aforementioned type.

BRIEF DESCRIPTION OF THE DRAWINGS

The invention will be better understood and other details, features and advantages of the invention will appear upon reading the following description given by way of a non-limiting example with reference to the appended drawings wherein:

FIG. 2 is a partial longitudinal section illustrating schematically the operation of seats of the "simple piston effect" type equipping a spherical plug according to the prior art;

FIG. 3 is a partial longitudinal section view illustrating schematically the operation of seats of the "double piston effect" type equipping a spherical plug according to the prior art;

DETAILED DESCRIPTION

Figure 1:
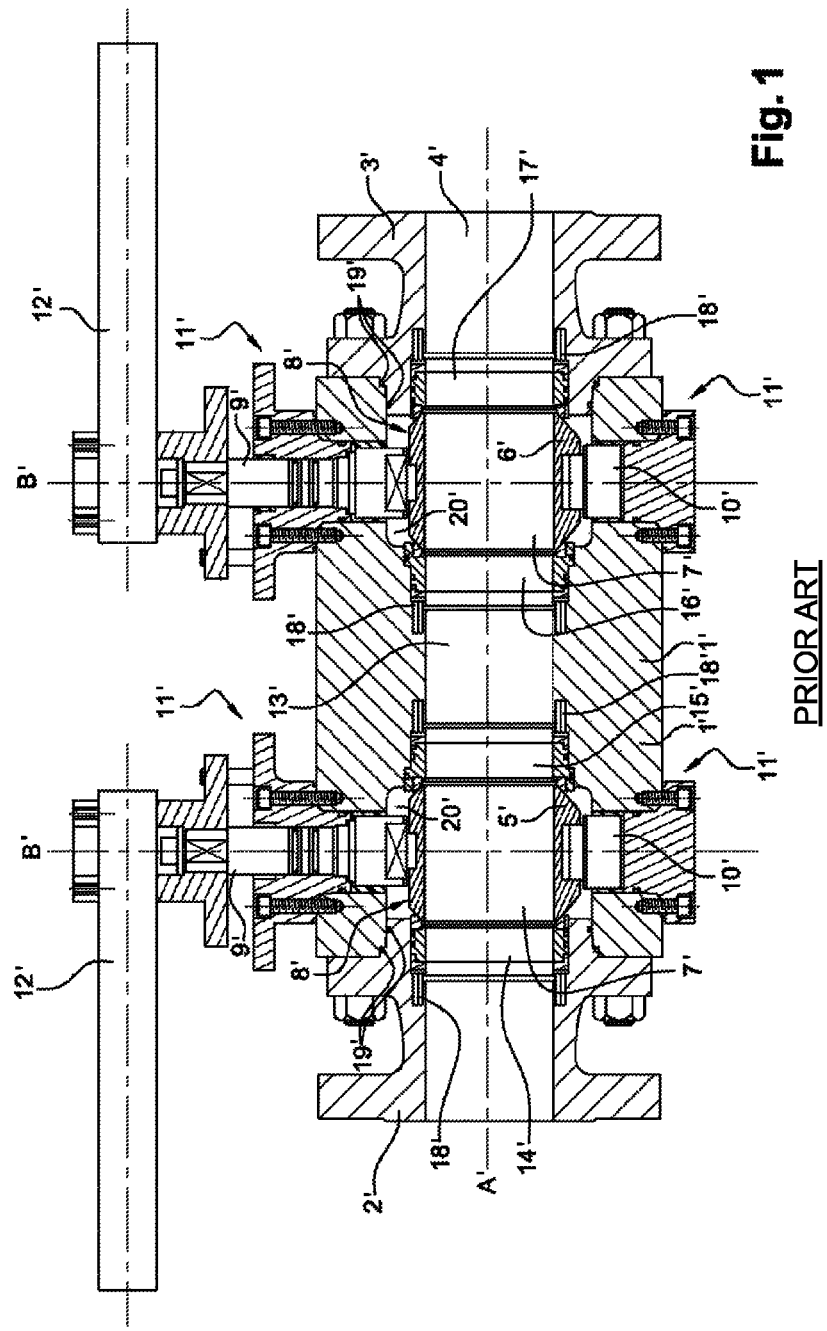
FIG. 1 is a sectional view of a prior art "double block and bleed" valve.

A "double block and bleed" or DBB type valve, according to the prior art, is shown in FIG. 1. It corresponds to the one already described in document WO 2010/131039 and comprises a body 1' including an upstream end on which is fixed a first flanged connector 2', designed to be connected for example to a gas extraction line of a liquefied gas storage tank, and a downstream end on which is fixed a second flanged connector 3' which can be un-connected with any pipe and therefore left in the open. The body 1' and the flanges 2', 3' comprise a fluid flow channel 4' extending along the longitudinal axis A' of the valve.

Upstream and downstream spherical plugs 5', 6' are mounted inside the body 1', each plug 5', 6' comprising a central cylindrical through hole 7' and an outer spherical surface 8'. Each plug 5', 6' is mounted about an axis B' formed by an upper shaft 9' and a lower shaft 10', mounted in sealed bearings 11' of the body 1'. Actuating means such as handles 12' or wheels are fastened to the upper shafts 9'. Each plug 5', 6' can thus be actuated independently, by pivoting the handle 12' or operating wheel through a quarter turn, between a position allowing flow of the fluid (FIG. 1) wherein the cylindrical hole 7' of the plug 5', 6' extends in alignment with the channel 4', and a closed position (not shown) wherein the cylindrical hole 7' of the plug 5', 6' extends perpendicular to the channel 4'.

The valve additionally comprises bleeding means (not visible in FIG. 1) leading, on the one hand, into the section 13' of the fluid flow channel 4' located between the upstream and downstream spherical plugs 5', 6' and, on the other hand, to the outer surface of the body 1'. Each plug 5', 6' is moreover equipped with an upstream seat 14', 16' and with a downstream set 15', 17' taking the form of rings accommodated inside the body 1' and the inner walls whereof extend substantially in alignment with the channel 4'. The seats 14', 15', 16', 17' are movable in translation along the longitudinal axis A' relative to the body 1'. Each seat 14', 15', 16', 17' comprises one end subjected to the force of return springs 18', and another end coming to bear sealingly against the outer surface 8' of the plug 5', 6'. Sealing gaskets are also provided between the body 1' and the seats 14', 15', 16', 17'.

When the plugs 5', 6' are in the open position, that is in the position allowing flow of fluid through the valve, more precisely through the channel 4', the fluid can flow freely from upstream to downstream, the fluid being prevented from flowing through different junction planes by sealing gaskets 19'. In this position, dead volumes 20', wherein gas can be confined, are formed outside the channel 4' between the body 1' and the outer walls 8' of the upstream and downstream plugs 5', 6'. When the two plugs 5', 6' are in the closed position, that is in the plugging position, the valve comprises a first dead volume 13' formed in the fluid flow channel 4', between the upstream and downstream plugs 5', 6'.

A second dead volume is formed by the volume 20' external to the channel 4', located between the outer wall 8' of the upstream plug 5' and the body 1'. The second dead volume also comprises the internal volume 7' of the upstream plug 5' which, in the closed position of the upstream plug 5', communicates with the aforementioned external volume 20'.

Finally, a third dead volume is formed by the volume 20' external to the channel 4', located between the outer wall 8' of the downstream plug 6' and the body 1'. The third dead volume also comprises the internal volume 7' of the downstream plug 6' which, in the closed position of the downstream plug 6', communicates with the aforementioned external volume 20'. As indicated previously, both in the open position and in the closed position of the plugs 5', 6', the gas imprisoned in the dead volumes expands in the event of fire and can cause cracking, or even explosion of the body 1' of the valve. The gas can then escape through the cracks created, thus supplying fuel to the fire.

In the prior art, it is known to equip the plugs 5', 6' either with seats of the "simple piston effect" type or with seats of the "double piston effect" type. FIG. 2 shows a spherical plug 5' equipped with upstream and downstream seats 14', 15' of the "simple piston effect" or SPE type. In this example, the upstream seat 14' comprises, from upstream to downstream, a first cylindrical portion 21' and a second cylindrical portion 22' with a larger diameter than the first portion 21'. The downstream end face of the seat 14' comprises a frusto-conical portion 25' wherein is provided an annular groove 26' for mounting an annular seal 27', designed to be pressed against the outer surface 8' of the spherical plug 14'. An O-ring 28' is moreover mounted in a groove 29' of the first portion 21' of the seat 14', and provides a seal between the seat 14' and the body 1'.

The upstream face 30' of the second portion 22' forms a shoulder which supports springs 18' mounted in recesses in the body 1'. The springs 18' exert longitudinally oriented forces so as to press the upstream seat 14' against the plug 5'. The plug 5' is also equipped with a downstream seat 15', the structure whereof is symmetrical with that of the upstream seat 14' with respect to the pivot axis B' of the plug 5'.

The operation of the upstream and downstream seats 14', 15' of the "simple piston effect" type is the following. It is assumed that the annular seal 27' of the upstream seat 14' is deteriorated so that it no longer completely provides its sealing function, a leakage of fluid occurring from the channel 4' toward the dead volume 20'. The pressure P1' in the channel 4' upstream of the upstream seat 14' is greater than P2', that in the dead volume 20', which in turn is greater than P3', that in the channel 4' downstream of the downstream seat 15'.

Considering the position of the different seals 27', 28' and the shape of the seat 14', the fluid enters into the interior of the groove 29' and into the annular space 31' located between the frusto-conical portion 25' of the upstream seat 14' and the outer surface 8' of the plug 5'. Thus, upstream of the plug 5', the fluid exerts a pressure P1' on all the faces of the upstream seat 14' with which it is in contact, directly or indirectly (for example by way of the seal 28'). In the remainder of the description, head losses will be neglected, and also the forces exerted by the springs 18', in order to facilitate understanding.

The surface or surfaces subjected to the fluid pressure P1', directly or indirectly (for example by way of the seal 28'), and oriented in the direction opposite to the spherical plug 5', are called the first surface, the surface or surfaces subjected to pressure P1', directly or indirectly, and oriented toward the spherical plug 5' being called the second surface. The pressure P1' exerted on the first surface of the upstream seat 14' generates a force Fc' oriented along the longitudinal axis A' and tending to press the upstream seat 14' against the spherical plug 5' while, on the contrary, the pressure P1' exerted on the second surface of the upstream seat 14' generates a force Fd' oriented along the axis A' and tending to detach the upstream seat 14' from the spherical plug 5'. The force Fc' depends on the projection of the first surface onto the plane perpendicular to the axis A' and the force Fd' depends on the projection of the second surface onto the aforementioned perpendicular plane.

In the case of FIG. 2, the projection of the first surface onto the plane perpendicular to the axis A' is greater than the projection of the second surface onto the plane perpendicular to the axis A' (as can be seen in FIG. 2, the difference between these two projections being denoted Δ1), so that the value (norm of the vector) of the force Fc' is greater than that of the force Fd', the resulting force R' being directed from upstream to downstream and tending to press the upstream seat 14' against the spherical plug 5'. In other words, due to the particular geometry of the upstream seat 14', the pressure P1' exerted on the first and second surfaces tends to press the upstream seat against the spherical plug 5'.

In addition, considering the position of the different seals 27', 28' and the shape of the downstream seat 15', the fluid leaving the dead volume 20' at pressure P2' enters into the interstice 32' located between the body 1' and the downstream seat 15', into the recesses of the springs 18' of the downstream seat, and into the groove 29' accommodating the seal 28' of the downstream seat 15'. As before, the surface or surfaces of the downstream seat 15' subjected to the fluid pressure P2', directly or indirectly, and oriented in the direction opposite to the spherical plug 5', are called the first surface, and the surface or surfaces of the downstream seat 15' subjected to pressure P2', directly or indirectly (for example by way of the seal 28'), and oriented toward the spherical plug 5' being called the second surface. The pressure P2' exerted on the first surface of the downstream seat 15' generates a force Fc' oriented along the longitudinal axis A' and tending to press the downstream seat 15' against the spherical plug 5' while, on the contrary, the pressure P2' exerted on the second surface generates a force Fd' oriented along the axis A' and tending to detach the downstream seat 15' from the spherical plug 5'.

In the case of FIG. 2, for the downstream seat 15', the projection of the first surface onto the plane perpendicular to the axis A' is less than the projection of the second surface onto the plane perpendicular to the axis A' (as can be seen in FIG. 2, the difference between the two projections being denoted Δ2), so that the value (norm of the vector) of the force Fc' is less than that of the force Fd', the resulting force being directed from upstream to downstream. In other words, due to the particular geometry of the downstream seat 15', the pressure P2' exerted on the first and second surfaces tends to detach the downstream seat 15' from the spherical plug 5'. Recall that the pressure P3' is lower than the pressure P2', which in turn is lower than the pressure P1', so that the effect of pressure P3' on the downstream seat 15' is negligible and the effect of pressure P2' on the upstream seat 14' is also negligible. It is noted that the seats 14', 15', of the "simple piston effect" or SPE type, are, in normal operation, pressed against the corresponding plug 5' but open in the event of overpressure into the dead volume 20' so as to allow the fluid from the dead volume 20' to escape toward the channel 4'.

FIG. 3 represents a spherical plug 5' equipped with upstream and downstream seats 14', 15' of the "double piston effect" or DPE type. In this example, the upstream seat 14 comprises, from upstream to downstream, a first cylindrical portion 21', a second cylindrical portion 22' with a diameter greater than that of the first portion 21', and a third cylindrical portion 23' with a diameter greater than that of the second portion 22'. The downstream end face of the upstream seat 14' comprises a frusto-conical portion 25' wherein is provided an annular groove 26' for mounting an annular seal 27', designed to be sealingly pressed against the outer surface 8' of the spherical plug 5'. An O-ring 28' is also mounted around the first portion 21' of the upstream seat 14', in an annular space 33' defined between the outer surface of the first portion 21' of the seat 14' and an internal cylindrical surface of the body 1', with a diameter substantially identical to that of the second portion 22" of the seat 14'. This O-ring 28' provides the sealing between the upstream seat 14' and the body 1'.

The upstream face of the third portion 23' forms a shoulder 30' supporting the springs 18' mounted in recesses in the body 1'. The springs 18' exert forces oriented longitudinally, so as to press the upstream seat 14' against the plug 5'. The plug 5' is also equipped with a downstream seat 15', the structure whereof is symmetrical with that of the upstream seat 14' with respect to the pivot axis B' of the plug 14'.

The operation of the "double piston effect" type seats is as follows. It is assumed that the annular seal 27' of the upstream seat 14' is deteriorated, so that it no longer fully accomplishes its sealing function, a fluid leak occurring from the channel 4' toward the dead volume 20'. The pressure P1' in the channel 4' upstream of the upstream seat 14' is greater than P2', that in the dead volume 20', which in turn is greater than P3', that in the channel 4' downstream of the downstream seat 15'.

Considering the position of the different seals 27', 28' and the shape of the upstream seat 14', the fluid enters inside the annular space 33' surrounding the first portion 21' of the upstream seat 14' and into the annular space 31' located between the frusto-conical portion 25' of the upstream seat 14' and the outer surface 8' of the plug 5'. Thus, upstream of the plug 5', the fluid exerts a pressure P1' on all the faces of the upstream seat 14' with which it is in contact, directly or indirectly (for example by way of the seal 28'). Hereafter in the description, head losses and forces exerted by the springs 18' will be neglected in order to facilitate understanding.

The surface or surfaces of the upstream seat 14' subjected to the fluid pressure P1', directly or indirectly (for example by way of the seal 28'), and oriented in the direction opposite to the spherical plug 5', are called the first surface, and the surface or surfaces subjected to pressure P1', directly or indirectly, and oriented toward the spherical plug 5', being called the second surface. The pressure P1' exerted on the first surface generates a force Fc' oriented along the longitudinal axis A' and tending to press the upstream seat 14' against the spherical plug 5' while, on the contrary, the pressure P1' exerted on the second surface generates a force Fd' oriented along the axis A' and tending to detach the upstream seat 14' from the spherical plug 5'. The force Fc' depends on the projection of the first surface onto the plane perpendicular to the axis A' and the force Fd' depends on the projection of the second surface onto the aforementioned perpendicular plane.

In the case of FIG. 3, for the upstream seat 14', the projection of the first surface onto the plane perpendicular to the axis A' is greater than that of the second surface (as can be seen in FIG. 3, the difference between these two projections being denoted Δ1), so that the value (norm of the vector) of the force Fc' is greater than that of the force Fd', the resulting force R' being directed from upstream to downstream and tending the press the upstream seat 14' against the spherical plug 5'. In other words, due to the particular geometry of the upstream seat 14', the pressure P1' exerted on the first and second surfaces tends to press the upstream seat 14' against the spherical plug 5'.

Moreover, considering the position of the different seals 27', 28' and the shape of the downstream seat 15', the fluid leaving the dead volume 20' at pressure P2' enters into the interstice 32' located between the body 1' and the downstream seat 15', into the housing springs 18', and into the annular space 33' located between the first portion 21" of the downstream seat 15' and the body 1'. For the downstream seat 15', the surface or surfaces subjected to the fluid pressure P2', directly or indirectly, and oriented in the direction opposite to the spherical plug 5', are called the first surface, and the surface or surfaces subjected to pressure P2', directly or indirectly, and oriented toward the spherical plug 5' being called the second surface. For the downstream seat 15', the pressure P2' exerted on the first surface generates a force Fc' oriented along the longitudinal axis A' and tending to press the downstream seat 15' against the spherical plug 5' while, on the contrary, the pressure P2' exerted on the second surface generates a force Fd' oriented along the axis A' and tending to detach the downstream seat 15' from the spherical plug 5'.

In the case of FIG. 3, for the downstream seat 15', the projection of the first surface onto the plane perpendicular to the axis A' is greater than the second surface, so that the value (norm of the vector) of the force Fc' is greater than that of the force Fd', the resulting force R' being directed from downstream to upstream. In other words, due to the particular geometry of the downstream seat 15', the pressure P2' exerted on the first and second surfaces tends to press the downstream seat 15' against the spherical plug 5'. Recall that the pressure P3' is lower than the pressure P2', which in turn is lower than the pressure P1', so that the effect of pressure P3' on the downstream seat 15' is negligible and the effect of pressure P2' on the upstream seat 14' is also negligible.

It is noted that the "double piston effect" or DPE type seats 14', 15' are, in normal operation, pressed against the corresponding plug 5', and do not open in the event of overpressure in the dead volume 20', the fluid thus remaining confined inside the dead volume 20' with no possibility of escape. As previously indicated, the use of a valve of the "double block and bleed" type according to the prior art, comprising four seats of the "simply piston effect" type or four seats of the "double piston effect" type, cannot be considered when this valve must withstand fire. Indeed, in the event of fire, the construction of the valve does not allow the gas under pressure to escape from all the dead volumes, so that there exists a risk of cracking or explosion of the valve body.

Figure 4:
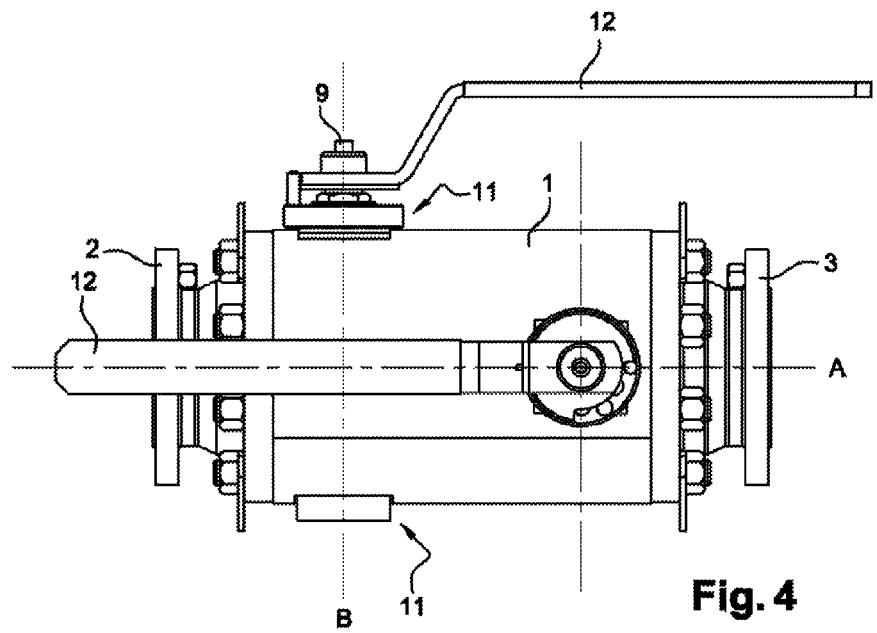
FIG. 4 is a front view of a valve according to the invention.
Figure 5:
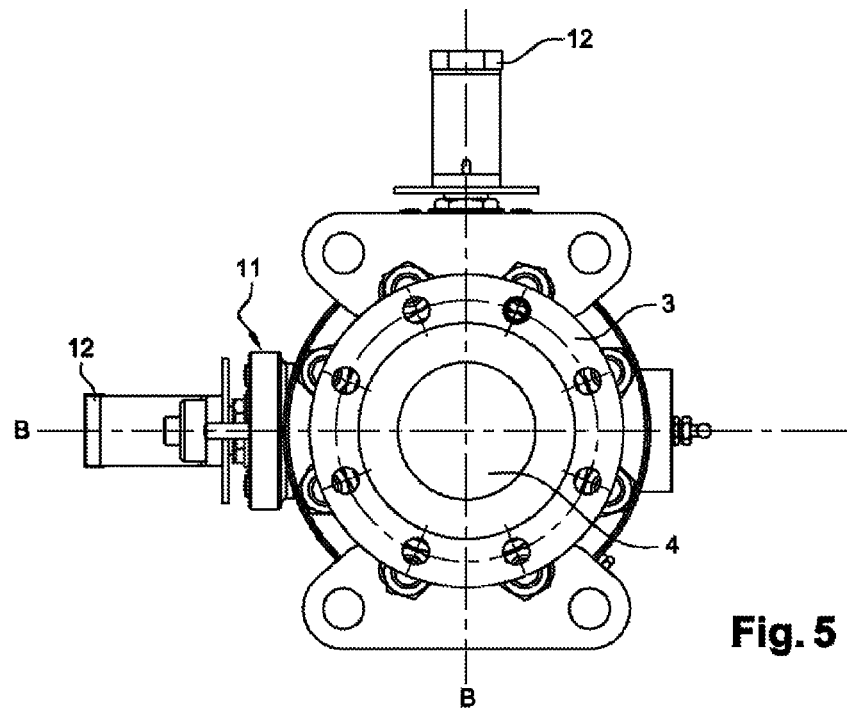
FIG. 5 is a side view of the valve of FIG. 4.
Figure 6:
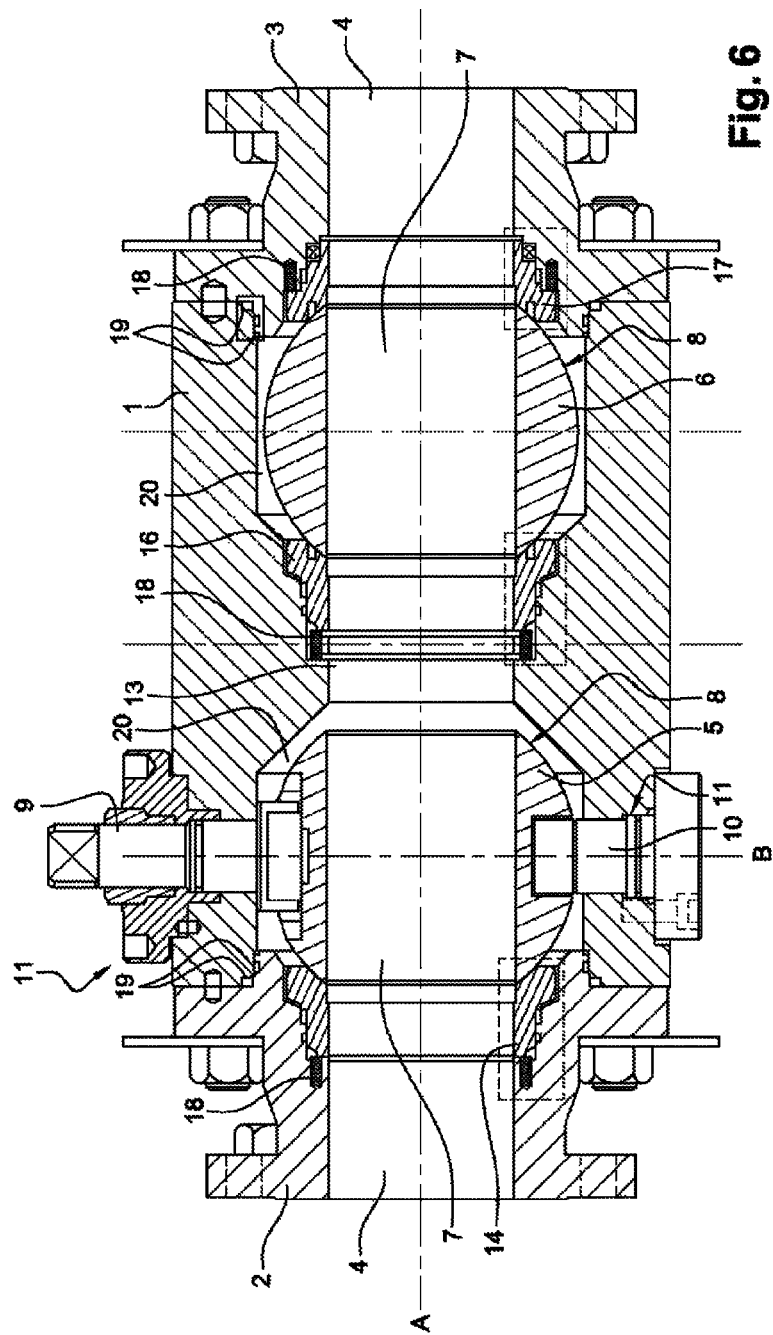
FIG. 6 is a longitudinal section view of the valve of FIG. 4.

FIGS. 4 to 6 illustrate a valve according to the invention, of the "double block and bleed" or DBB type. This comprises a body 1 including an upstream end on which is fixed a first flanged connector 2, designed to be connected for example to a pipe for extracting gas from a liquefied gas storage tank, and a downstream end on which is fixed a second flanged connector 3 which can be un-connected to any pipe and thus left in the open. The body 1 and the flanges 2, 3 comprise a channel 4 for fluid flow extending along the longitudinal axis A of the valve.

Upstream and downstream spherical plug 5, 6 are mounted in the body 1, each plug 5, 6 comprising a central cylindrical through hole 7 and an outer spherical surface 8. Each plug 5, 6 is mounted around an axis B formed by an upper shaft 9 and a lower shaft 10, mounted in sealed bearings 11 of the body 1. Actuation means such as handles or wheels are mounted on the upper shafts 9. Each plug 5, 6 can thus be actuated independently, by pivoting the handle or operating wheel through a quarter turn, between a fluid flow position (FIG. 6) wherein the cylindrical hole 7 of the plug 5, 6 extends in alignment with the channel 4, and a plugging position (not shown) wherein the cylindrical hole 7 of the plug 5, 6 extends perpendicular to the channel 4.

The valve also comprises bleeding means 34 (FIG. 13) leading, on the one hand, into the section 13 of the fluid flow channel 4 located between the upstream and downstream spherical plugs 5, 6 and, on the other hand, to the outer surface of the body 1. These bleeding means 34 will be better described hereafter, with reference to FIG. 13.

As previously indicated, each plug 5, 6 is also equipped with at least one seat 14, 16, 17 taking the form of a ring accommodated in the body 1 and the internal wall whereof extends substantially in alignment with the channel 4. The seats 14, 16, 17 are mounted movable in translation along the longitudinal axis relative to the body 1. Each seat 14, 16, 17 comprises an end subjected to the force of the return springs 18, and another end coming to bear sealingly against the outer surface 8 of the corresponding plug 5, 6.

More particularly, the upstream plug 5 is equipped with an upstream seat 14 of the "simple piston effect" type and has no downstream seat, the downstream plug 6 being equipped with an upstream seat 16 of the "simple piston effect" type and a downstream seat 17 of the "double piston effect" type. When the plugs 5, 6 are in the open position, that is in the position allowing flow of the fluid through the valve, more precisely through the channel 4, the fluid can flow freely from upstream to downstream, the fluid being prevented from flowing through different junction planes by sealing gaskets 19. In this position, a dead volume 20, wherein gas can be confined, is located outside the channel 4, between the body 1 and the outer surface 8 of the downstream plug 6.

When the two plugs 5, 6 are in the closed position, that is to say in the plugging position, the valve comprises a first dead volume 13 formed in the fluid flow channel 4 between the outer surfaces 8 of the upstream and downstream plugs 5, 6. This is also connected to the dead volume formed by the volume 20 external to the channel 4, situated between the outer surface 8 of the upstream seat 14 and the body 1, and to the internal volume 7 of the upstream seat 14 which, in the closed position of the upstream seat 14, communicates with the aforementioned external volume 20.

A second dead volume is formed by the volume 20 external to the aforementioned channel 4, located between the outer surface 8 of the downstream plug 6 and the body 1. The second dead volume also comprises the internal volume 7 of the downstream plug 6 which, in the closed position of the downstream plug 6, communicates with the aforementioned external volume 20. In the event of overpressure inside dead volumes, in particular in the event of fire, the upstream seats 14, 16 detach from the upstream and downstream plugs 5, 6, the downstream seat 17 remaining pressed against the downstream plug 6. In this manner, the fluid under pressure contained in the dead volumes 7, 13, 20 can escape upstream, for example toward a tank, no fluid normally being able to flow downstream of the downstream plug 6. This ensures that fluid, such as for example gas, does not fuel the fire.

Figure 7:
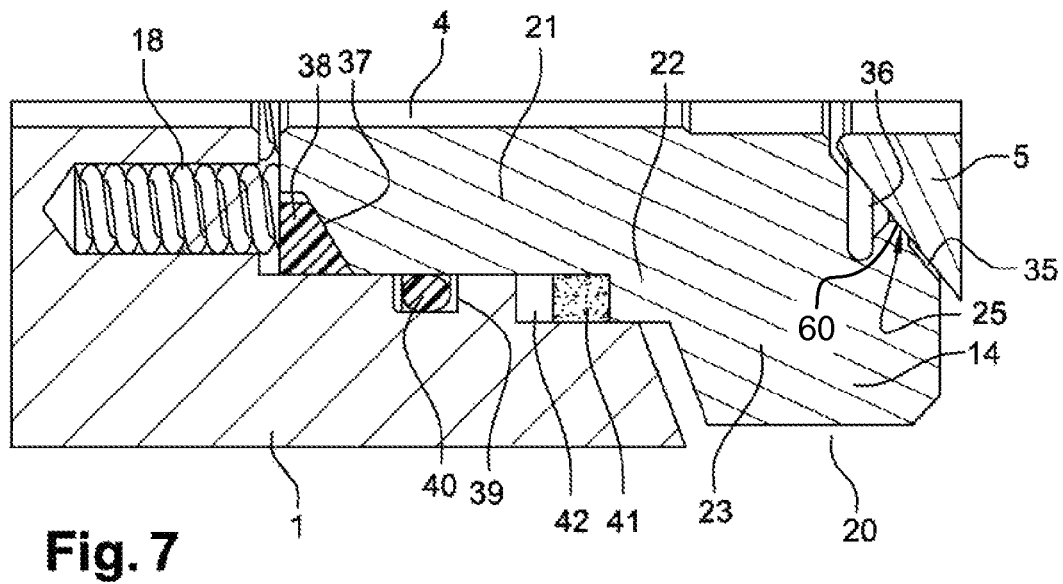
FIG. 7 is a detail view illustrating the structure of the upstream seat of the upstream plug.

FIG. 7 is a detail view showing the structure of the upstream seat 14 equipping the upstream plug 5. This seat 14 comprises, from upstream to downstream, a first cylindrical portion 21", a second cylindrical portion 22" having a larger diameter than that of the first portion 21", and a third cylindrical portion 23" having a diameter greater than that of the second cylindrical portion 22". The downstream end face of the upstream seat 14 comprises a frusto-conical portion 25 (or having the shape of a segment of a sphere), bounded by upstream and downstream annular gaps 35, 36. The frusto-conical portion 25 is designed to come into sealing contact against the upstream plug 5 and is covered, at least in part, with a layer of tungsten carbide 60.

Springs 18 mounted in recesses in the body 1 bear against the upstream end of the upstream seat 14. The springs 18 exert forces oriented longitudinally, so as to press the upstream seat 14 against the upstream plug 5. An annular recess 37 is provided at the upstream end of the upstream seat 14, said recess leading upstream and radially outward. A seal 38, made of polytetrafluoroethylene for example, is mounted in this recess 37. An annular groove 39 is provided in the body, facing the first portion 21" of the seat 14, and is used to accommodate an O-ring 40 providing a seal between the seat 14 and the body 1. The seal 40 is for example made of a synthetic elastomeric material of the type known under the brand name Viton® AED.

Another seal 41, made of graphite for example, is mounted around the first portion 21" of the upstream seat 14 and downstream of the aforementioned groove 39, in an annular space 42 defined between the outer surface of the first portion 21" of the seat 14 and an inner cylindrical surface of the body 1, with a diameter substantially identical to that of the second portion 22" of the seat 14. This seal 41 is designed to limit the upstream flow of fluid but does not provide a complete seal between the seat 14 and the body 1, said seal being provided by the O-ring 40 mounted in the groove 39.

The operation of this "simple piston effect" type seat 14 will now be described with reference to FIG. 8. In this figure, certain non-functional elements have been removed, partially or totally, in order to facilitate understanding. Thus the seal 41 in particular, which does not provide complete sealing, has been removed. The operation of the upstream seat 14 of the upstream plug 5 is similar to that of the seats in FIG. 2.

It is assumed that the fluid contained in the first dead volume (7, 13, 20 when the two plugs are in the closed position) is subjected to an overpressure P2, for example in the event of a fire. The pressure P2 in a dead volume 7, 13, 20 is therefore greater than P1, that inside the fluid flow channel 4. Considering the position of the O-ring 40, that of the frusto-conical portion 25 and the non sealing character of the seal 41, the fluid leaving the dead volume 7, 13, 20 at pressure P2 enters the annular spaces provided between the upstream seat 14 and the upstream plug 5 and between the upstream seat 14 and the body 1. In particular, the fluid penetrates into the annular space 42 and into the groove 39.

As before, the surface or surfaces of the upstream seat 14 subjected to the fluid pressure P2, directly or indirectly (for example by way of the seal 41), and oriented in the direction opposite to the spherical plug 5, are called the first surface, the surface or surfaces of the upstream seat 14 subjected to pressure P2, directly or indirectly, and oriented toward the spherical plug 5 being called the second surface. The pressure P2 exerted on the first surface generates a force Fc oriented along the longitudinal axis A and tending to press the downstream seat against the spherical plug while, on the contrary, the pressure P2 exerted on the second surface generates a force Fd oriented along the axis A and tending to detach the upstream seat 14 from the spherical plug 5. For the upstream seat 14 of FIGS. 7 and 8, however, the projection S1 of the first surface onto the plane perpendicular to the axis A is less than S2, that of the second surface, so that the value (norm of the vector) of the force Fc is less than that of the force Fd, the resulting force R being directed from downstream to upstream. In other words, due to the particular geometry of the upstream seat 14, the pressure P2 exerted on the first and second surfaces tends to separate the upstream seat 14 from the upstream spherical plug 5.

Recall that the pressure P2 is considerably greater than the pressure P1, so that the effect of the pressure P1 on the upstream seat 14 is negligible. Thus, as indicated previously, when the plug 5 is closed, this upstream seat 14, of the "simple piston effect" type, opens in the event of an overpressure in the dead volume 7, 13, 20 relative to the pressure inside the fluid flow channel 4, so as to allow the fluid in the dead space 7, 13, 20 to escape toward said channel 4.

Figure 8:
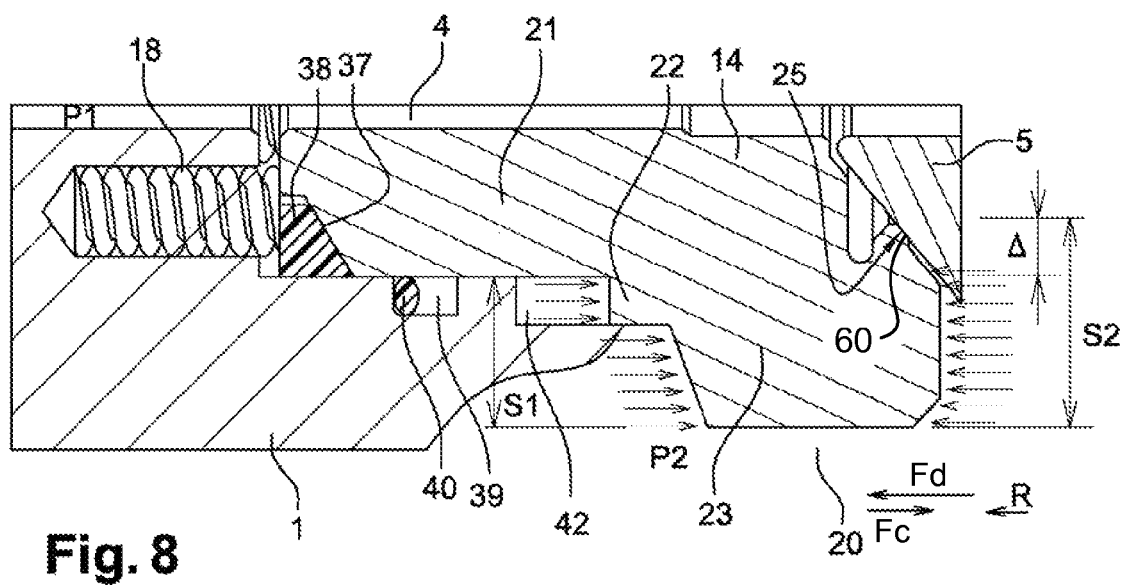
FIG. 8 is a view corresponding substantially to FIG. 7, illustrating schematically the operation of the upstream seat of the upstream plug.
Figure 9:
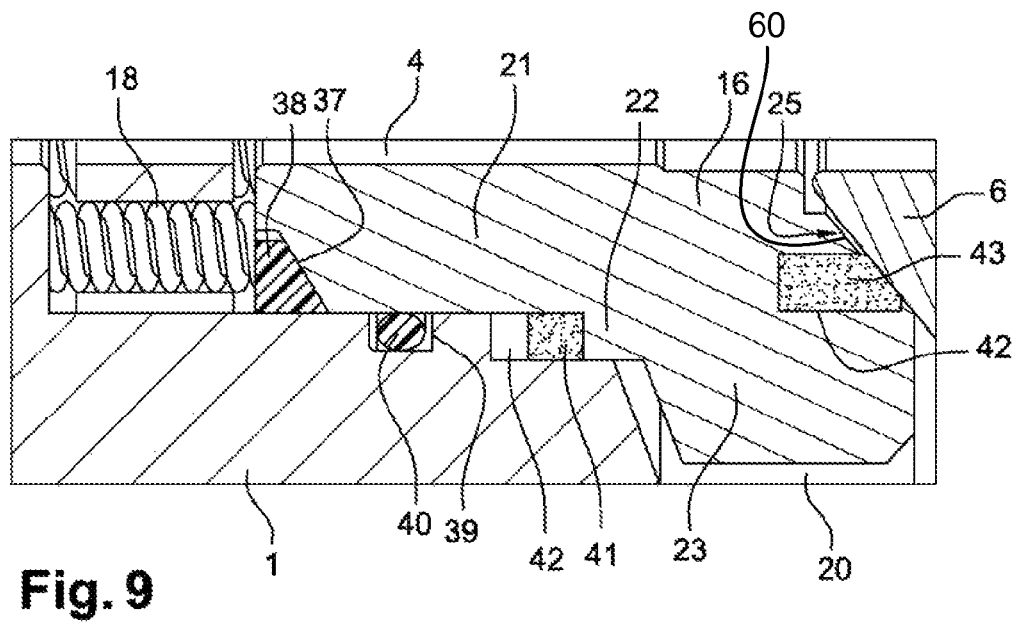
FIG. 9 is a detail view illustrating the structure of the upstream seat of the downstream plug.
Figure 10:
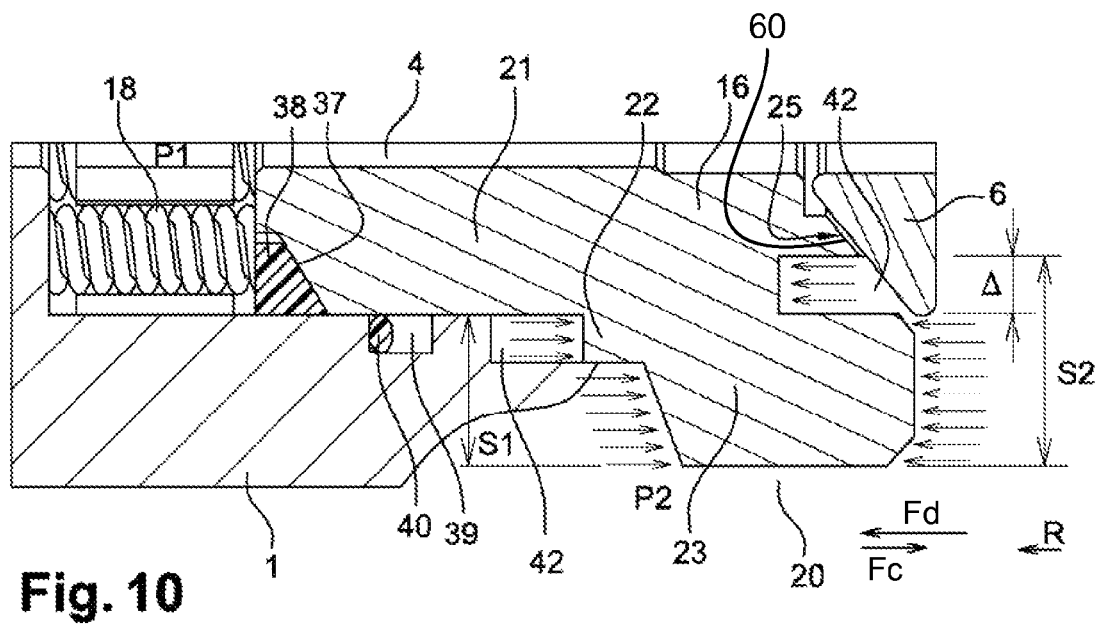
FIG. 10 is a view corresponding substantially to FIG. 9, illustrating schematically the operation of the upstream seat of the downstream plug.

FIGS. 9 and 10 are detail views corresponding respectively to FIGS. 7 and 8 and illustrating respectively the structure of the upstream seat 16 equipping the downstream plug 6 and the operation of this upstream seat 16. The structure of the upstream seat 16 equipping the downstream plug 6 is similar to that of the upstream seat 14 equipping the upstream plug 5, only the differences between these two seats 14, 16 being detailed hereafter. The front face of the upstream seat 16 equipping the downstream plug 6 includes a frusto-conical portion 25 (or a spherical segment) wherein is provided an annular groove 42 used to accommodate an insert 43 made for example of a polymer such as that known under the trade name DEVLON.

This insert 43 also protrudes slightly from the frusto-conical portion 25, the sealing abutment of the upstream seat 16 on the downstream plug 6 being accomplished by this insert 43. The frusto-conical portion 25, however, is capable of coming into sealing contact against the downstream plug 6, in the event of deterioration of the insert 43, particularly in the event of a fire.

FIG. 10 illustrates the behavior of this seat 16 in the event of overpressure inside the second dead volume 20. It is assumed for example that the insert 43 has disappeared under the influence of the elevated temperature due to a fire. It is noted that the seal 41, if it is made of graphite, withstands very high temperatures. The seal 40 is also not deteriorated, considering the fact that it is protected within a groove 39 and separated from the high-temperature regions by considerable thicknesses of material.

The behavior of this seat 16 is identical to that of the upstream seat 14 equipping the upstream plug 5: the pressure P2 exerted on the first surface generates a force Fc oriented along the longitudinal axis A and tending to press the upstream seat 16 against the spherical plug 6 while, on the contrary, the pressure P2 exerted on the second surface generates a force Fd oriented along the axis A and tending to detach the upstream seat from the spherical plug 6. For this upstream seat of FIGS. 9 and 10, the projection S1 of the first surface onto the plane perpendicular to the axis A is less than S2, that of the second surface, so that the value (norm of the vector) of the force Fc is less than that of the force Fd, the resulting force R being directed from downstream to upstream. In other words, due to the particular geometry of the upstream seat 16, the pressure P2 exerted on the first and second surfaces tends to separate the upstream seat 16 from the downstream plug 6.

Figure 11:
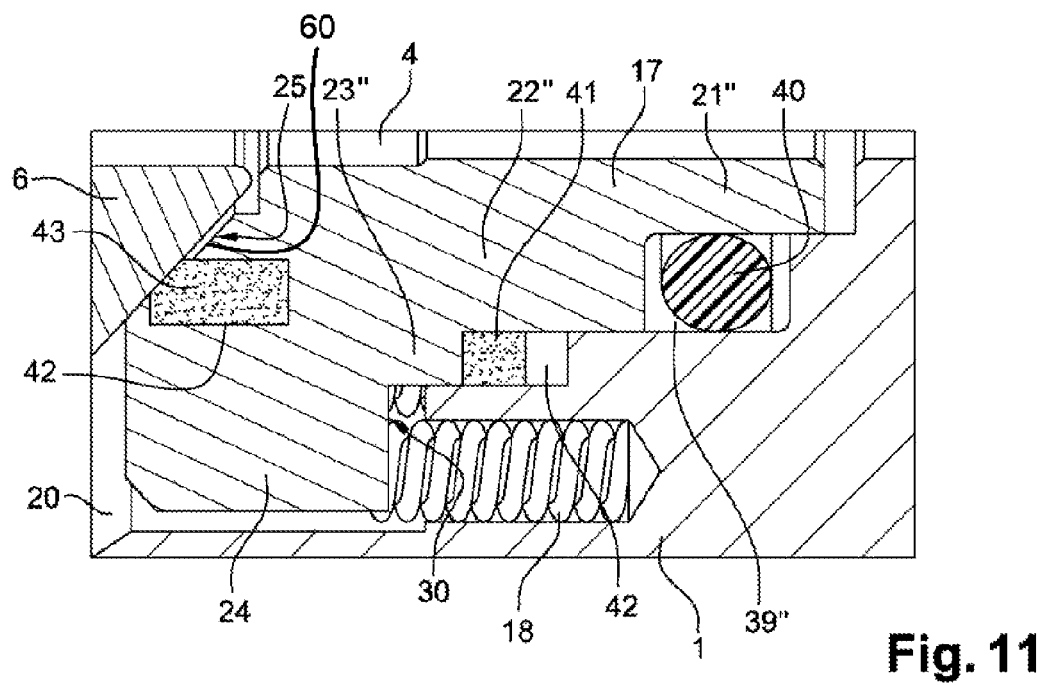
FIG. 11 is a detail view illustrating the structure of the downstream seat of the downstream plug.
Figure 12:
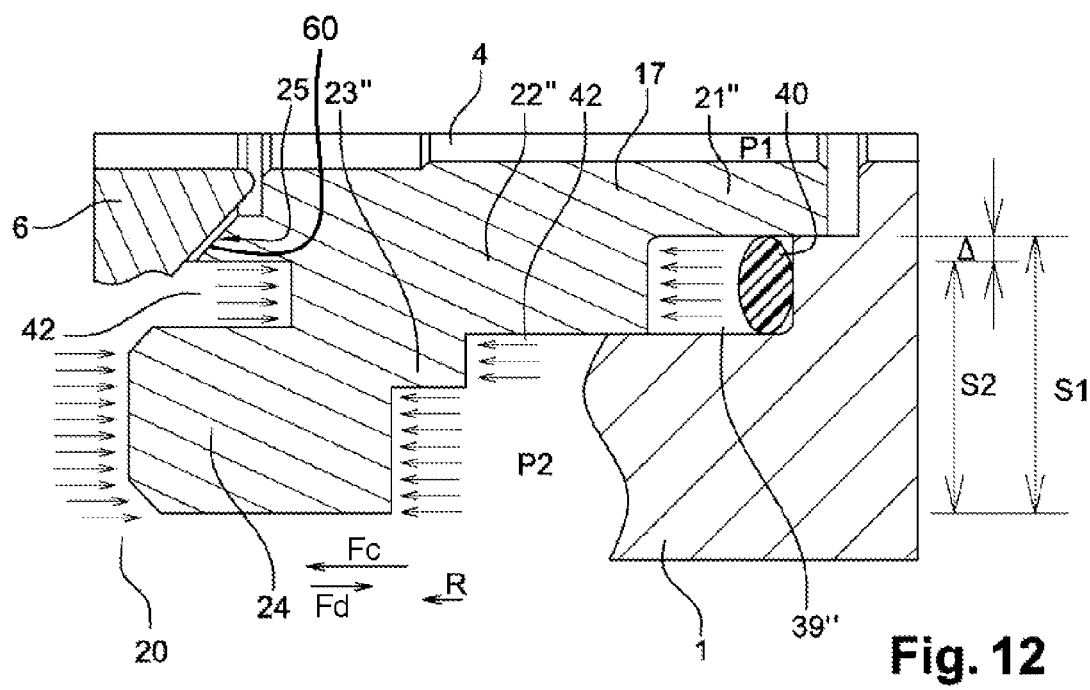
FIG. 12 is a view corresponding substantially to FIG. 11, illustrating schematically the operation of the downstream seat of the downstream plug.

FIGS. 11 and 12 are detail views illustrating respectively the structure of the downstream seat 17 equipping the downstream plug 6 and the operation of this downstream seat 17. This downstream seat 17 comprises, from downstream to upstream, a first cylindrical portion 21", a second cylindrical portion 22" with a greater diameter than that of the first portion 21", a third cylindrical portion 23" with a diameter greater than that of the second portion 22", and a fourth cylindrical portion 24 with a diameter greater than that of the third portion 23". The upstream end face of the downstream seat comprises a frusto-conical portion 25 (or shaped like a segment of a sphere), wherein is provided a groove 42 accommodating an insert 43 similar to that of FIGS. 9 and 10, made for example of a polymer such as that known under the trade name DEVLON.

As before, this insert 43 protrudes slightly from the frusto-conical portion 25, the sealing abutment of the downstream seat 17 on the downstream plug 6 being accomplished by this insert 43. The frusto-conical portion 25 is however capable of coming into sealing contact against the downstream plug 6, in the event of deterioration of the insert 43, particularly in the event of a fire.

An O-ring 40, made for example of a synthetic elastomeric material of the type of that known under the trade name Viton® AED, is mounted around the first portion 21" of the seat 17, in an annular space 39" defined between the outer surface of the first portion 21" of the seat 17 and an inner cylindrical surface of the body 1, with a diameter substantially identical to that of the second portion 22" of the seat 17. This O-ring 40 provides the sealing between the downstream seat 17 and the body 1. Another seal 41, made of graphite for example, is mounted about the second portion 22" of the seat 17, in an annular space 42 defined between the outer surface of the second portion 22" of the seat 17 and an inner cylindrical surface of the body 1, with a diameter substantially identical to that of the third portion 23 of the seat 17. This seal 41 is designed to limit downstream flow of fluid but does not provide a complete seal between the seat 17 and the body 1, said seal being provided by the aforementioned O-ring 40.

The downstream face of the fourth portion 24 forms a shoulder 30 supporting the springs 18 mounted in recesses in the body 1. The springs 18 exert forces oriented longitudinally so as to press the downstream seat 17 against the downstream plug 6.

The operation of this "double piston effect" type seat 17 will now be described with reference to FIG. 12. In this figure, certain non-functional elements have been removed, partially or totally, to facilitate comprehension. The operation of the downstream seat of the downstream plug 6 is similar to that of the seats of FIG. 3.

It is assumed that the fluid contained in the second dead volume 20 is subjected to an overpressure P2, for example due to exposure to a fire. The pressure P2 in this dead volume is therefore greater than P1, that inside the fluid flow channel 4. It is also assumed that the insert 43 has vanished under the influence of the elevated temperature due to the fire. It will be noted that the seal 41, if it is made of graphite, withstands very high temperatures. The seal 40 is also not deteriorated, considering the fact that it is protected inside the annular space 39" and is separated from high-temperature regions by considerable thicknesses of material.

Considering the position of the O-ring 40, that of the frusto-conical portion 25 and the non sealing nature of the seal 41, the fluid leaving the dead volume at pressure P2 enters into the annular spaces provided between the downstream seat and the downstream plug and between the downstream seat and the body. In particular, the fluid enters into the annular spaces 39" and 42. As before, the surface or surfaces of the downstream seat 17 subjected to the fluid pressure P2, directly or indirectly (for example by way of the graphite seal 41), and oriented in the direction opposite to the spherical plug 6, are called the first surface, and the surface or surfaces of the downstream seat 17 subjected to pressure P2, directly or indirectly, and oriented toward the spherical plug 6 being called the second surface.

The pressure P2 exerted on the first surface generates a force Fc oriented along the longitudinal axis A and tending to press the downstream seat 17 against the spherical plug 6 while, on the contrary, the pressure P2 exerted on the second surface generates a force Fd oriented along the axis A and tending to detach the downstream seat 17 from the spherical plug 6. For the downstream seat 17 of FIGS. 11 and 12, however, the projection of the first surface onto the plane perpendicular to the axis A is greater than that of the second surface, so that the value (norm of the vector) of the force Fc is greater than that of the force Fd, the resulting force R being directed from downstream to upstream. In other words, due to the particular geometry of the downstream seat 17, the pressure P2 exerted on the first and second surfaces tends to press the downstream seat 17 onto the spherical plug 6.

Recall that the pressure P2 is considerably greater than the pressure P1, so that the effect of the pressure P1 on the downstream seat 17 is negligible. Thus, as indicated earlier, this "double piston effect" type downstream seat 17 does not open, even in the event of overpressure in the dead space, so as to avoid any downstream flow of fluid.

Figure 13:
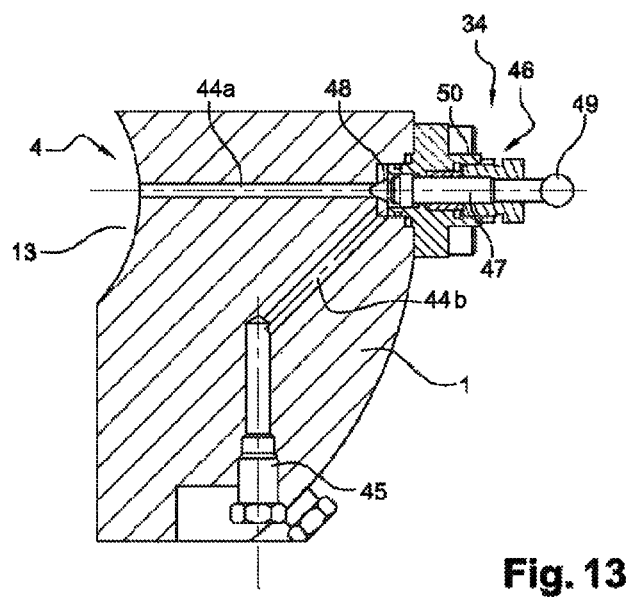
FIG. 13 is a detail view illustrating the structure of the bleeding means.

FIG. 13 illustrates the bleeding means 34 mounted between the two plugs 5, 6 of the valve according to the invention. These means 34 comprise a first bleed channel 44a, provided in the body and leading radially into the fluid flow channel 4, in the region 13 located between the upstream and downstream plugs 5, 6. The first bleed channel 44a is in fluid connection with a first end of a second bleed channel 44b, provided in the body 1. The second end of the second channel 44b leads to the outer surface of the body 1, by way of ordinary connection means 45.

A plug 46 is mounted at the junction between the first and second bleed channels 44a, 44b. It comprises a radial rod 47, one end whereof bears a conical head 48 which is inserted into the corresponding end of the first channel 44a so as to plug it, and the second end whereof comprises actuating means 49. The rod 47 comprises a thread cooperating with a tapped thread of a nut 50 fixed on the body 1. The rod, and hence the conical head, is movable between a plugging position shown in FIG. 13, wherein the head 48 is in abutment with the corresponding end of the first channel 44a, and a bleed position (not shown), wherein the head 48 is withdrawn from said end of the first channel 44a. Such plugs 34 are known from the prior art. The invention thus proposes a valve of the "double block and bleed" type making it possible to guarantee downstream sealing simply and reliably, even in the event of fire.

The invention claimed is:

1. An isolation valve comprising a body including a fluid flow channel, adapted to be plugged by upstream and downstream spherical plugs which can be actuated independently of one another between positions for fluid flow through the channel and closing positions of the channel, and a sealing checker leading into the channel and between the two spherical plugs, the spherical plugs being equipped with seats associated with an elastic return so as to bear sealingly against the spherical plugs around the channel, a dead volume being defined between an outer wall of each spherical plug and the body, outside of the fluid flow channel, each seat being adapted to be subjected to the pressure of the fluid located inside the channel and the pressure of the fluid contained in the dead volume, wherein the upstream spherical plug is equipped with an upstream seat and has no downstream seat, the downstream spherical plug being equipped with an upstream seat and a downstream seat, the upstream seats being able to separate from the spherical plugs in the event of overpressure inside the corresponding dead volumes, and the downstream seat being adapted to remain to bear sealingly against the downstream spherical plug in the event of overpressure inside the corresponding dead volume.

2. The valve according to claim 1, wherein the upstream seat of the upstream plug comprises an annular spherical segment or frusto-conical surface designed to come into sealing contact with the upstream plug and covered, at least in part, with a layer of tungsten carbide.

3. The valve according to claim 1, wherein the upstream seat and/or the downstream seat of the downstream plug comprise annular inserts designed to come to bear sealingly against the downstream plug.

4. The valve according to claim 3, wherein the upstream seat and/or the downstream seat of the downstream plug further comprise an annular spherical segment or frusto-conical surface, capable of coming into sealing contact with the downstream plug, in the event of deterioration of the inserts.

5. The valve according to claim 1, wherein the upstream seats of the upstream and downstream plugs are movable in translation relative to the body, along a longitudinal axis, each of said upstream seats comprising a first surface and a second surface, respectively oriented in directions facing toward and away from the plug, adapted to be subjected to the pressure of the fluid in the dead volume so that this pressure, applied to the first surface, tends to apply the upstream seat to the plug and this pressure, applied to the second surface, tends to detach the upstream seat from the plug, a projection of the second surface onto a plane perpendicular to the longitudinal axis being greater than a projection of the first surface onto the perpendicular plane, so that the resulting force applied by the pressure of the fluid in the dead volume onto the upstream seat tends to detach the upstream seat from the corresponding plug.

6. The valve according to claim 1, wherein the downstream seat of the downstream plug is movable in translation relative to the body, along a longitudinal axis and comprises a first surface and a second surface, oriented respectively in directions facing toward and away from the downstream plug, adapted to be subjected to the pressure of the fluid in the dead volume so that the pressure applied to the first surface tends to apply the downstream seat onto the downstream plug and said pressure applied to the second surface tends to detach the downstream seat from the downstream plug, a projection of the first surface onto a plane perpendicular to the longitudinal axis being greater than that of the second surface so that the resulting force applied by the pressure of the fluid in the dead volume to the downstream seat tends to press the downstream seat against the downstream plug.

7. The valve according to claim 1, comprising at least one annular seal providing the sealing between each of said upstream seats and the body, the seal being accommodated in an annular groove of the body or of the upstream seat.

8. The valve according to claim 1, comprising at least one annular seal providing the sealing between the downstream seat of the downstream plug and the body, the seal being mounted in an annular space defined between an outer cylindrical wall of the downstream seat and an inner cylindrical wall of the body, having a diameter greater than the outer cylindrical wall of the downstream seat.

9. The valve according to claim 1, wherein the sealing checker comprises bleeding means leading into a section of the fluid flow channel located between the upstream and downstream plugs.

10. A gas storage tank, particularly for liquefied gas, comprising a pipe for extracting the gas contained in the tank, wherein the extraction pipe comprises a valve which further comprises a body including a fluid flow channel, adapted to be plugged by upstream and downstream spherical plugs which can be actuated independently of one another between positions for fluid flow through the channel and closing positions of the channel, and a sealing checker leading into the channel and between the two spherical plugs, the spherical plugs being equipped with seats associated with an elastic return so as to bear sealingly against the spherical plugs around the channel, a dead volume being defined between an outer wall of each spherical plug and the body, outside of the fluid flow channel, each of said seats being adapted to be subjected to the pressure of the fluid located inside the channel and the pressure of the fluid contained in the dead volume, wherein the upstream spherical plug is equipped with an upstream seat and has no downstream seat, the downstream spherical plug being equipped with an upstream seat and a downstream seat, the upstream seats being able to separate from the spherical plugs in the event of overpressure inside the corresponding dead volumes, and the downstream seat being adapted to remain to bear sealingly against on the downstream spherical plug in the event of overpressure inside the corresponding dead volume.

* * * * *